(12) United States Patent
Mendes et al.

(10) Patent No.: US 12,389,200 B2
(45) Date of Patent: Aug. 12, 2025

(54) SYSTEM AND METHOD FOR OBJECT LOCALIZATION IN AN INDOOR ENVIRONMENT

(71) Applicant: Airbus (S.A.S.), Blagnac (FR)

(72) Inventors: Paulo Mendes, Munich (DE); Thomas Multerer, Taufkirchen (DE); Fabien Geyer, Munich (DE)

(73) Assignee: Airbus (S.A.S.), Blagnac (FR)

( * ) Notice: Subject to any disclaimer, the term of this patent is extended or adjusted under 35 U.S.C. 154(b) by 394 days.

(21) Appl. No.: 17/853,397

(22) Filed: Jun. 29, 2022

(65) Prior Publication Data

US 2022/0329980 A1 Oct. 13, 2022

Related U.S. Application Data

(63) Continuation of application No. PCT/EP2020/086744, filed on Dec. 17, 2020.

(30) Foreign Application Priority Data

Dec. 30, 2019 (DE) ...................... 10 2019 220 630.1

(51) Int. Cl.
*H04W 4/029* (2018.01)
*H04W 4/33* (2018.01)

(52) U.S. Cl.
CPC ............ *H04W 4/029* (2018.02); *H04W 4/33* (2018.02)

(58) Field of Classification Search
CPC ....... H04W 4/029; H04W 4/33; H04W 84/12; H04W 88/08; H04W 4/02; G06N 20/00; H04L 67/12
See application file for complete search history.

(56) References Cited

U.S. PATENT DOCUMENTS 6,556,832 B1 * 4/2003 Soliman ................ H04W 16/18
  342/357.31
10,108,903 B1 10/2018 Piao et al.
(Continued)

FOREIGN PATENT DOCUMENTS

CN 104883732 A 9/2015
CN 106131958 A 11/2016
(Continued)

OTHER PUBLICATIONS

An Example of Indoor Positioning Possibility Using WiFi Network and Mobile Phone—2022 (Year: 2022).*
(Continued)

*Primary Examiner* — Nizar N Sivji
(74) *Attorney, Agent, or Firm* — KDW Firm PLLC

(57) ABSTRACT

A system for object localization in an indoor environment, such as a passenger cabin of a vehicle or an aircraft, includes a wireless communication infrastructure to facilitate wireless communication within the indoor environment via a wireless communication network and including at least one wireless access point to provide user devices access to the wireless communication network within the indoor environment. The wireless access point is adapted to acquire signal propagation data of wireless signals transmitted over the wireless communication network along multiple propagation paths. A computing element is configured to analyze the signal propagation data and extract localization data from the signal propagation data, the localization data specifying the position of objects located within the indoor environment.

16 Claims, 2 Drawing Sheets

(56) References Cited

U.S. PATENT DOCUMENTS

| | | | | |
|---|---|---|---|---|
| 11,644,191 | B2* | 5/2023 | Dableh | G06T 7/254 |
| | | | | 250/338.1 |
| 2015/0163633 | A1 | 6/2015 | Mishra | |
| 2015/0237471 | A1* | 8/2015 | Li | G01S 5/02521 |
| | | | | 455/456.2 |
| 2015/0312774 | A1* | 10/2015 | Lau | G05D 1/0274 |
| | | | | 455/446 |
| 2016/0047890 | A1* | 2/2016 | Ryan | H04W 4/02 |
| | | | | 398/118 |
| 2016/0066158 | A1* | 3/2016 | Xiao | H04W 4/021 |
| | | | | 455/456.1 |
| 2019/0170869 | A1 | 6/2019 | Kravets et al. | |
| 2019/0349715 | A1* | 11/2019 | Ghourchian | H04W 4/33 |
| 2020/0228924 | A1* | 7/2020 | Lelkens | G01S 5/021 |

FOREIGN PATENT DOCUMENTS

| | | | | |
|---|---|---|---|---|
| CN | 106802404 A | | 6/2017 | |
| KR | 101711791 B1 | | 2/2017 | |
| WO | WO-2016011433 A2 * | | 1/2016 | G01S 13/00 |
| WO | WO-2016011433 A3 * | | 3/2016 | G01S 13/00 |
| WO | WO 2020/145949 A1 | | 7/2020 | |

OTHER PUBLICATIONS

A Testbed For Device Free Indoor Localization System—2015 (Year: 2015).*

IP movement detection and indoor positioning based on Integrating RFID and WLAN—2013 (Year: 2013).*

CSI-Based Device-Free Indoor Localization Using Convolutional Neural Networks—2018 (Year: 2018).*

Indoor Localization System Benchmark Based on Wireless Local Network Technologies—2014 (Year: 2014).*

Cai Chenwai et al, "CSI-Based Device-Free Indoor Localization Using Convolutional Neural Networks," 2018 IEEE 4th International Conference on Computer and Communications, IEEE, Dec. 7, 2018, pp. 753-757.

Rao Xinping et al, "MSDFL: a robust minimal hardware low-cost device-free WLAN localization system," Neural Computing and Applications, Springer London, vol. 31, No. 12, Jan. 18, 2019, pp. 9261-9278.

German Office Action for Application No. 102019220630 dated Aug. 17, 2020.

International Search Report and Written Opinion for Application No. PCT/EP2020/086744 dated Feb. 24, 2021.

International Preliminary Report on Patentability for Application No. PCT/EP2020/086744 dated Jul. 5, 2022.

The State Intellectual Property Office of Peoples Republic of China Second Office Action in CN Application No. 202080090685.7, dated Jul. 3, 2024, 6 pages.

The State Intellectual Property Office of Peoples Republic of China Third Office Action for CN Application 202080090685.7, dated Sep. 20, 2024, 6 pages.

European Office Action in EP Application No. 20835767.3, dated Feb. 12, 2025, 8 pages.

Ma et al., "WiFi Sensing with Channel State Information: A Survey," ACM Computer Survey, 35 pages (Jan. 2019).

Chinese First Office Action and Search Report in CN Application No. 202080090685.7, dated Mar. 13, 2024, 9 pages.

* cited by examiner

101

SYSTEM AND METHOD FOR OBJECT LOCALIZATION IN AN INDOOR ENVIRONMENT

CROSS-REFERENCE TO RELATED APPLICATIONS

This application is a continuation of and claims priority to Patent Application No. PCT/EP2020/086744 filed Dec. 17, 2020 which claims priority to German Patent Application No. 10 2019 220 630.1 filed Dec. 30, 2019, the entire disclosures of which are incorporated by reference herein.

TECHNICAL FIELD

The disclosure herein pertains to a system and a method for object localization, particularly in a passenger cabin of a vehicle, especially of an aircraft.

Although it can be used in many applications, the disclosure herein and the problems underlying it are explained in greater detail in relation to passenger aircraft. However, the methods and devices described can likewise be used in different vehicles and in all sectors of the transport industry, e.g. for road vehicles, for rail vehicles, for general aircraft or for watercraft. Moreover, the systems and methods disclosed herein may be used for other environments, such as automated or semi-automated assembly lines for tracking the flow of components.

BACKGROUND

The vast majority of current indoor localization methods, available on the market, requires the installation of additional equipment in the area where the localization is performed. This may be considered a disadvantage in the case of object localization within a vehicle cabin since additional equipment normally implies additional weight as well as extra certification. Hence, there is a need to find simpler solutions for indoor localization that are compatible with the specific requirements of vehicle cabins.

Document WO 2018/094502 A1 describes a device-free localization method within smart indoor environments within an indoor area, e.g. an apartment or other living area, covered by wireless networks utilizing active off-the-shelf-devices. The method exploits existing wireless communication signals and machine learning techniques in order to automatically detect entrance into the area and track the location of a moving subject within the sensing area.

Document Ma et al., "WiFi Sensing with Channel State Information: A Survey," ACM Computer Survey, 2019, provides an overview of signal processing techniques, algorithms, applications and performance results of WiFi sensing with Channel State Information (CSI). CSI represents how wireless signals propagate from a transmitter to a receiver at certain carrier frequencies along multiple paths. For example, CSI may be a 3D matrix of complex values representing the amplitude attenuation and phase shift of multi-path WiFi channels. A time series of CSI measurements captures how wireless signals travel through surrounding objects and humans in time, frequency and spatial domains, and hence it can be used for different wireless sensing applications.

SUMMARY

Against this background, it is an object of the disclosure herein to find simple, cost and weight efficient solutions for passively locating objects, for example in an indoor environment such as a vehicle cabin.

This object is achieved by a system, an aircraft, and a method disclosed herein.

According to an aspect of the disclosure herein, a system for object localization in an indoor environment, particularly in a passenger cabin of a vehicle, in particular of an aircraft, comprises a wireless communication infrastructure adapted to facilitate wireless communication within the indoor environment via a wireless communication network and comprising at least one wireless access point adapted to provide user devices access to the wireless communication network within the indoor environment, wherein the wireless access point is further adapted to acquire signal propagation data of wireless signals transmitted over the wireless communication network along multiple propagation paths; and a computing element configured to analyze the signal propagation data and extract localization data from the signal propagation data, the localization data specifying the position of objects located within the indoor environment.

According to a further aspect of the disclosure herein, an aircraft has a passenger cabin equipped with a system according to the disclosure herein.

According to yet a further aspect of the disclosure herein, a method for object localization in a passenger cabin of a vehicle, in particular of an aircraft, using a system according to the disclosure herein comprises acquiring signal propagation data of wireless signals transmitted over the wireless communication network along multiple propagation paths; and analyzing the signal propagation data and extracting localization data from the signal propagation data, the localization data specifying the position of objects located within the passenger cabin.

One idea of the disclosure herein is to use a wireless communication architecture already present inside aircraft and other typical vehicle cabins to passively locate mobile and immobile objects in the indoor environment of the respective cabin. To this end, the disclosure herein utilizes the hardware of the communication devices of the wireless access points provided in the vehicle for wireless internet access of user devices, e.g. personal electronic devices like smartphones, tablet computers and so on. This is based on the inventive insight that these communication devices are principally capable of acquiring all information present in the wireless signals transmitted over the wireless communication network of the cabin and relevant for tracking and/or locating objects within the cabin. In many applications, it is sufficient to merely adjust and/or update the software of the respective communication devices of the wireless access points in order to enable the system for object localization. Radio-frequency signals (e.g. amplitude and phase of RF symbols) used to exchange information between the different access points can then be used to sense and fingerprint the environment and detect changes. Changes can also be detected by analyzing the changes over time of the radio signals due to the movement of objects (e.g. Doppler shift), including vibration and rotation. Those changes may then be used for predicting the position of an object.

The disclosure herein thus is able to locate objects in a vehicle cabin without additional electronics (passive localization) and without adding special sensing equipment. This makes it possible to locate objects, such as forgotten luggage from passengers, for example, or safety equipment like life vests or the like, without the need of additional equipment on the respective object. During aircraft operation, the disclosure herein will reduce the workload of the cabin crew and speed up turnaround times.

The disclosure herein may generally be used for the localization of people, objects and small displacements (e.g. vibrations) inside a vehicle cabin, such as an aircraft cabin. Such localization capabilities can be used to ease deployment of aircraft equipment (e.g. sensors) in the final assembly line, during aircraft operation to support crew activities (e.g. check aircraft status after landing), or for predictive maintenance.

The computing element of the disclosure herein may be installed anywhere within the indoor environment, such as a vehicle cabin, and may be in wireless or wired data communication with the wireless access points. The system may thus offer a distributed data analysis approach. However, the computing element may also be provided at the respective access point. Moreover, the computing element may even be provided outside of the indoor environment.

Advantageous embodiments and improvements are disclosed herein.

According to an embodiment of the disclosure herein, the wireless communication infrastructure may comprise a plurality of wireless access points. The signal propagation data may comprise correlation data of the wireless access points.

The disclosure herein basically works with one or more access points. In the presence of multiple access points however, the method is able to exploit the spatial feature of fingerprints from multiple adjacent access points placed inside the indoor environment, such as a vehicle cabin. Such a spatial relationship among adjacent fingerprints makes it robust against signal variations. Further, challenging scenarios such as non-line of sight environments can be tackled. Based on the collected data from the different wireless access points, a preprocessing and normalization process may be applied in order to extract relevant features.

In order to increase the accuracy of the system, the correlation of the data generated by the various access points available in the indoor environment may be performed. Collected data may be correlated according to their time of measurement in order to have a common measurement of the environment at a given time. This use of multiple access points enables to cover a larger part of the indoor environment from different measurement points, meaning that the area where indoor positioning is done will have better coverage. This is especially helpful in an indoor environment with other objects, since those other objects may block partially the propagation of the RF signals. Multiple access points can also be used to increase the accuracy of the system in line of sight and non-line of sight situations.

According to an embodiment of the disclosure herein, the signal propagation data may comprise channel state information (CSI).

In wireless communications, CSI characterizes how wireless signals propagate from a transmitter to a receiver at certain carrier frequencies. These information represent the combined effect of, for example, scattering, fading, and power decay with distance. CSI amplitude and phase are impacted by multi-path effects including amplitude attenuation and phase shift. Specifically, the CSI is impacted by the displacements and movements of the transmitter, receiver, and surrounding objects. In other words, CSI captures the wireless characteristics of the environment. These characteristics, assisted by mathematical modelling or machine learning algorithms, can be used for different sensing applications.

According to an embodiment of the disclosure herein, the signal propagation data may comprise spatial, frequency and/or temporal variations of the wireless signals within the passenger cabin.

For example, CSI amplitude variations in the time domain have different patterns for different movements, which can be used for motion detection, including vibration and rotation. CSI phase shifts in the spatial and frequency domains, i.e., transmit/receive antennas and carrier frequencies, are related to signal transmission delay and direction, which can be used for object localization and tracking.

According to an embodiment of the disclosure herein, each wireless access point may be a standard commercial wireless device operating according to a IEEE 802.11 standard. However, the disclosure herein may also rely on other wireless standards in other embodiments.

For example, the communication architecture may be based on standard technologies such as IEEE 802.11n or IEEE 802.11ac or the like.

According to an embodiment of the disclosure herein, the computing element may be configured to execute a machine-learning algorithm on the signal propagation data. The machine-learning algorithm may be configured to extract the position data based on training data being generated using an object position measurement system within the passenger cabin. Alternatively or additionally, the machine-learning algorithm may be configured to extract the position data based on training data being generated using a predetermined test object arrangement within the passenger cabin. Correspondingly, the method may comprise executing a machine-learning algorithm on the signal propagation data extracting the position data based on training data being generated using at least one of an object position measurement system and a predetermined test object arrangement within the passenger cabin.

The data acquired by the wireless access points may be passed to a machine learning algorithm which makes a prediction on the position of objects in the indoor environment. In order to train the algorithm, a training phase may first be performed where the position of objects is measured. In order to find this position, an external positioning system may be used, for example. This external positioning system can be based on a standard computer vision approach. Using one or multiple cameras and markers, specific objects can be marked and their positions can be easily extracted. Another possible external positioning system can be based on the usage of accelerometers or gyroscopes, which are used to compute an object's displacement by transforming the information of an external sensor. Given original coordinates of an object (e.g. aircraft entry door), the final position can be estimated according to the directional displacement.

The computed positions, based on external positioning systems such as computer vision or accelerometers, may then be used in order to train the machine learning algorithm. Multiple measurements may then be performed in a given target environment, where objects are moved throughout the environment while the raw information from the wireless network architecture is recorded. Standard optimization methods may then be used for training the machine learning algorithm. Once the training is finalized, an evaluation phase may be performed. The position of objects may then be directly predicted using only the information coming from the wireless network architecture.

According to an embodiment of the disclosure herein, the machine-learning algorithm may be configured to extract the locations of static objects within the indoor environment. Correspondingly, the method may comprise extracting the locations of static objects within the indoor environment. It is understood however that the machine-learning algorithm may also extract the locations of moving/mobile objects.

For example, the machine learning algorithm may be trained on a predetermined test object arrangement within the indoor environment, such as a passenger cabin. As soon as an object from this test object arrangement is shifted to a different position within the cabin or removed completely from the cabin during operation of the system, the signal propagation data will change compared to the training phase. These changes will even reflect in the signal propagation data if the object is static after the movement. Moreover, additional (static) objects within the cabin that were not considered during the training phase may affect the signal propagation data during operation of the system.

According to an embodiment of the disclosure herein, the signal propagation data may be provided as raw data on the physical layer of the wireless communication infrastructure.

For example, raw data from the physical layer (in the form of IQ-samples) of the communication layer such as Channel-State-Information (CSI) may be used. Moreover, changes over time of the IQ samples can be utilized. In case multiple wireless access points are used, the collected data may be correlated according to their time of measurement in order to have a common measurement of the environment at a given time.

According to an embodiment of the disclosure herein, the system may further comprise a data aggregation unit in wireless communication with the wireless access points and configured to collect the signal propagation data of the wireless access points and transfer it to the computing element. Each wireless access point may be configured to preprocess the raw data generated at the respective wireless access point and transfer it to the data aggregation unit.

Hence, in order to treat the data from the different access points efficiently and avoid overloading the communication infrastructure with additional sensing data, the processing may be performed using a distributed approach. This solution enables to easily scale the disclosure herein with the number of access points. Each access point may already locally preprocess its own raw data before sending it to the aggregation unit. The aggregation unit will then collect the preprocessed data produced by all the access points in order to make the final prediction of the position.

The disclosure herein will be explained in greater detail with reference to exemplary embodiments depicted in the drawings as appended.

BRIEF DESCRIPTION OF THE DRAWINGS

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

Figure 1:
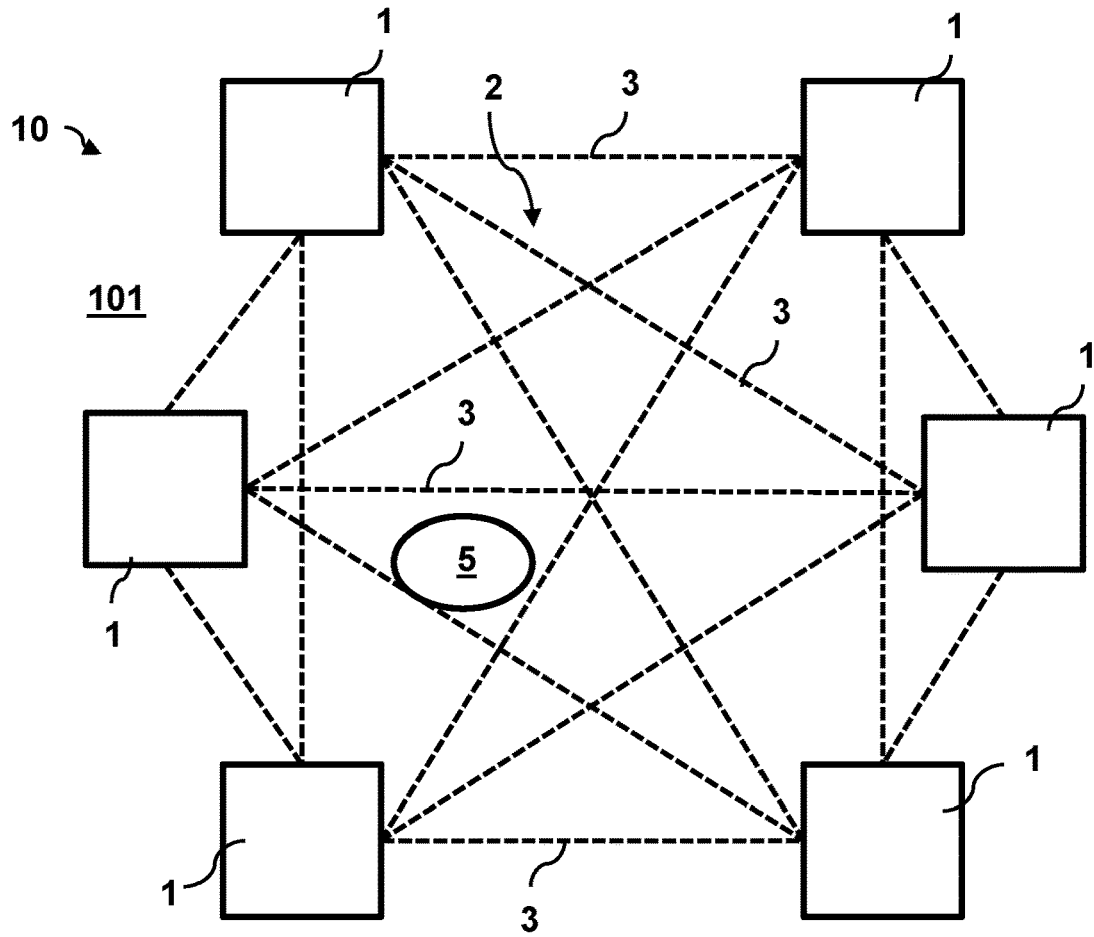
FIG. 1 shows a schematic view of a system for object localization in a passenger cabin of an aircraft according to an embodiment of the disclosure herein.
Figure 3:
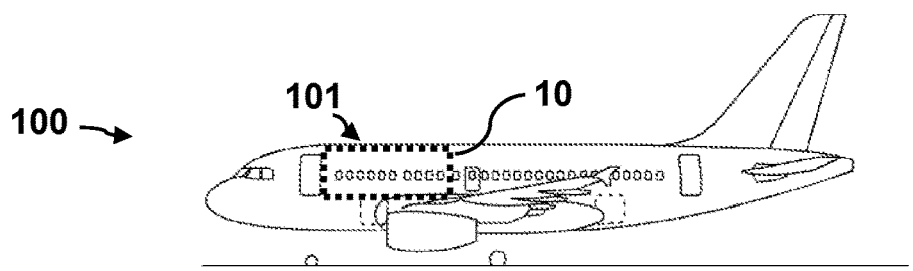
FIG. 3 shows a schematic side view of an aircraft having a passenger cabin equipped with the system of FIG. 1.
Figure 4:
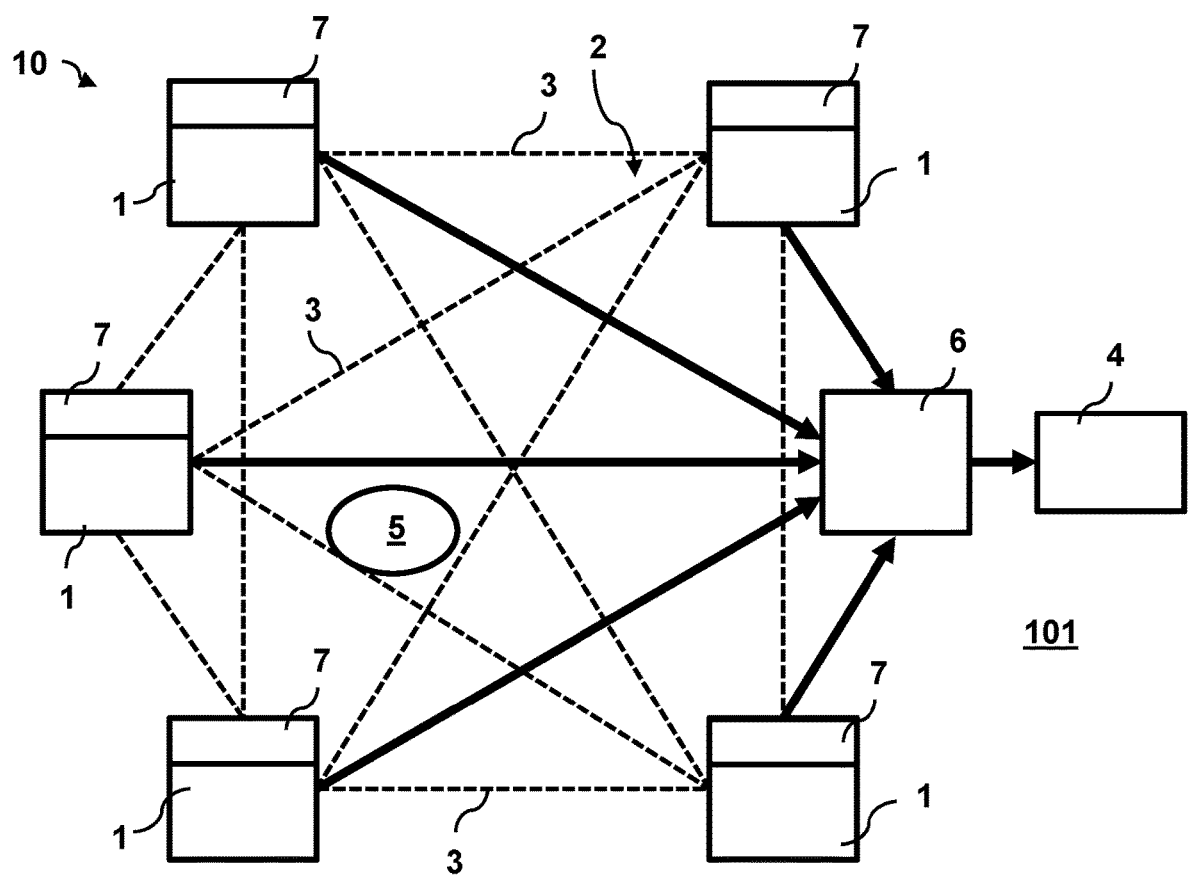
FIG. 4 shows a different schematic view of the system of FIG. 1.

FIGS. 1 and 4 show schematic views of a system 10 for object localization in an indoor environment 101. Exemplarily, the system 10 is explained in conjunction with a passenger cabin 101 of an aircraft 100 as the indoor environment, e.g. the passenger aircraft 100 depicted in FIG. 3, according to an embodiment of the disclosure herein.

The system 10 comprises a wireless communication infrastructure used to facilitate wireless communication within the passenger cabin 101 via a wireless communication network 2 and comprising a plurality of wireless access points 1 used to provide user devices access to the wireless communication network 2 within the passenger cabin 101. To this end, each wireless access point 1 comprises a standard commercial wireless device operating for instance according to a IEEE 802.11 standard, e.g. IEEE 802.11n or IEEE 802.11ac or similar. This wireless communication infrastructure corresponds to wireless communication systems as they are widely used within vehicle cabins, in particular aircraft cabins, for providing the crew and/or the passengers with wireless computing and/or communication access, e.g. to the Internet, as well as for wireless sensor networks and machine-to-machine communication.

However, contrary to these well-known systems, the wireless access points 1 are further adapted to acquire signal propagation data of wireless signals 3 transmitted over the wireless communication network 2 along multiple propagation paths. The signal propagation data may particularly comprise channel state information (CSI) and similar quantitative information on the spatial, frequency and temporal variations of the wireless signals 3 within the passenger cabin 101. These data can be used to monitor the indoor area traversed by the wireless signals and to establish if any change in the positions of objects 5 takes place within the passenger cabin 101.

For example, amplitude and phase of the radio-frequency signals exchanged between the wireless access points 1 may be analyzed to get a fingerprint of the passenger cabin 101 and to detect changes within this environment, which then can be used to predict the position of an object 5 within the passenger cabin 101. Also changes over time of the radio signals due to the movement of objects 5 may be analyzed (e.g. via Doppler shift) in order to track moving objects 5 within the passenger cabin 101. The primary goal is to locate objects 5 passively in the passenger cabin 101 (cf. FIGS. 1 and 4) by using a finger-printing technique based on machine learning, aggregation of the data from multiple measurement spots and distributed processing.

To this end, the wireless access points 1 process the signal propagation data as raw data on the physical layer of the wireless communication infrastructure (e.g. in the form of IQ-samples). The collected signal propagation data is correlated according to their time of measurement. Based on the collected data from the different wireless access points 1, a preprocessing and normalization process is applied in order to extract relevant features. Formatting of the data for processing, using machine learning techniques, is also performed at this step. In the example of FIG. 4, each access point 1 comprises a processing unit 6 for this preprocessing step (cf. further below).

For the analysis of the acquired signal propagation data, the system 10 further comprises a data aggregation unit 6 in wireless communication with the wireless access points 1 (cf. FIG. 4). The data aggregation unit 6 receives the preprocessed signal propagation data from the wireless access points 1 and forwards it to a central computing element 4 configured to analyze the signal propagation data and extract localization data from the signal propagation data. The computing element 4 may be a processor or similar, which is integrated into a computing framework of the aircraft 100 and which may be coupled to a cabin management system of the aircraft 100, for example. The localization data specify the position, and possibly also the movement, of objects 5 located within the passenger cabin 101.

The computing element 4 is configured to execute a machine-learning algorithm on the signal propagation data in order to extract the position data based on training data. The training data may be generated, for example, using an object position measurement system within the passenger cabin 101 to detect and track labelled objects 5 during a training phase. At the same time, the system 10 may constantly monitor signal propagation data within the passenger cabin 101. The recorded positional information of these tracked objects 5 may be used in conjunction with the acquired signal propagation data to train the machine-learning algorithm during this test phase.

Alternatively or additionally, other training variants are possible, as the person of skill will readily realize. Another possible external positioning system can be based on the usage of accelerometers or gyroscopes. In another example, a predetermined test arrangement of test objects 5 may be used to calibrate the signal propagation data in a training phase. The machine-learning algorithm may then be executed on signal propagation data recorded during operation of the system 10.

Based on such a training phase, the machine-learning algorithm is then able to extract the positions not only of moving, but also of static objects 5 within the passenger cabin 101. For example, the training phase may have been performed on an empty cabin. The machine-learning algorithm now will notice any changes to this empty state of the passenger cabin 101. Thus, any new objects 5 within the passenger cabin 101 may be detected on basis of respective changes within the signal propagation data compared to the training scenario. In a similar vein, the system 10 will be able to distinguish any change in position of objects 5 present in the passenger cabin 101 during the training phase.

As a result, objects 5 such as forgotten luggage from passengers or safety equipment such as life vests may be detected and possibly tracked without introducing expensive and heavy additional equipment within the passenger cabin 101. On the contrary, an already existing wireless communication infrastructure merely needs to be enhanced, e.g. by a simple software update, to be able to record and analyze signal propagation data, which is generated within the cabin in any case.

Figure 2:
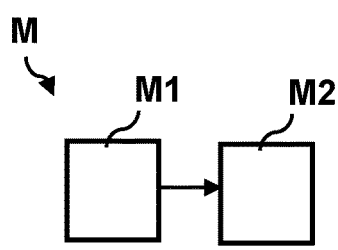
FIG. 2 shows a schematic flow diagram of a method for object localization using the system of FIG. 1.

FIG. 2 shows a schematic flow diagram of a method for object localization using the system 10 of FIGS. 1 and 4. The method M comprises under M1 acquiring signal propagation data of wireless signals 3 transmitted over the wireless communication network 2 along multiple propagation paths. The method M further comprises under M2 analyzing the signal propagation data and extracting localization data from the signal propagation data. This may comprise executing a machine-learning algorithm on the signal propagation data extracting the position data based on training data being generated using at least one of an object position measurement system and a predetermined test object arrangement within the passenger cabin. Specifically, the machine-learning algorithm may extract the locations of static objects 5 within the passenger cabin 101.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. The embodiments were chosen and described in order to best explain the principles of the disclosure herein and its practical applications, to thereby enable others skilled in the art to best utilize the disclosure herein and various embodiments with various modifications as are suited to the particular use contemplated. Many other examples will be apparent to one skilled in the art upon reviewing the above specification.

The subject matter disclosed herein can be implemented in or with software in combination with hardware and/or firmware. For example, the subject matter described herein can be implemented in or with software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 wireless access point
2 wireless communication network 3 wireless signal
4 computing element
5 object
6 data aggregation unit
7 processing unit
10 system for object localization
100 aircraft
101 passenger cabin
M method
M1-M2 method steps

The invention claimed is:

1. A system for object localization in an indoor environment, comprising:
   a wireless communication infrastructure configured to facilitate wireless communication within the indoor environment via a wireless communication network and comprising at least one wireless access point adapted to provide user devices access to the wireless communication network within the indoor environment, wherein the wireless access point is configured to acquire signal propagation data of wireless signals transmitted over the wireless communication network along multiple propagation paths; and
   a computing element configured to execute an algorithm to analyze the signal propagation data and extract localization data from the signal propagation data, the localization data specifying a position of objects located within the indoor environment, wherein the algorithm is based on test localization data corresponding to a predetermined test arrangement of test objects within the indoor environment;
   wherein the algorithm is trained to extract localization data from signal propagation data using training data received from an external positioning system; and
   wherein the algorithm is a machine-learning algorithm executed on the signal propagation data, wherein the machine-learning algorithm is configured to extract the position data based on training data being generated using at least the predetermined test object arrangement within the indoor environment.

2. The system according to claim 1, wherein the wireless communication infrastructure comprises a plurality of wireless access points, wherein the signal propagation data comprise correlation data of the wireless access points.

3. The system according to claim 1, wherein the signal propagation data comprise channel state information, CSI.

4. The system according to claim 1, wherein the signal propagation data comprise at least one of spatial, frequency and temporal variations of the wireless signals within the indoor environment.

5. The system according to claim 1, wherein each wireless access point is a standard commercial wireless device operating according to a IEEE 802.11 standard.

6. The system according to claim 1, wherein the machine-learning algorithm is configured to extract locations of static objects within the indoor environment.

7. The system according to claim 1, wherein the signal propagation data are provided as raw data on a physical layer of the wireless communication infrastructure.

8. The system according to claim 7, wherein the system comprises:
   a set of wireless access points; and
   a data aggregation unit in wireless communication with the set of wireless access points and configured to collect the signal propagation data of the set of wireless access points and transfer it to the computing element, wherein each wireless access point in the set of wireless access points is configured to preprocess the raw data generated at the respective wireless access point and transfer it to the data aggregation unit.

9. The system of claim 8, wherein pre-processing the raw data generated at the respective wireless access point includes a processing circuit on the wireless access point being configured to:
   normalize the raw data according to a normalization process and extract relevant features from the normalized raw data; and
   wherein the extracted relevant features are forwarded to the data aggregation unit to aggregate the extracted relevant features from the set of wireless access points.

10. The system of claim 7, wherein the raw data on the physical layer of the wireless communication infrastructure is received in the form of IQ-samples.

11. The system according to claim 1, wherein the indoor environment is a passenger cabin of a vehicle.

12. The system according to claim 11, wherein the vehicle is an aircraft.

13. The system of claim 1, wherein the external positioning system includes a computer vision based external positioning system or a positioning system that uses accelerometers or gyroscopes.

14. An aircraft having a passenger cabin equipped with a system according to claim 1.

15. A method for object localization in an indoor environment, or in a passenger cabin of a vehicle or an aircraft, the method comprising:
   providing a system for object localization in the indoor environment or the passenger cabin, the system comprising:
      a wireless communication infrastructure configured to facilitate wireless communication within the indoor environment or the passenger cabin via a wireless communication network and comprising at least one wireless access point adapted to provide user devices access to the wireless communication network within the indoor environment or the passenger cabin, wherein the wireless access point is configured to acquire signal propagation data of wireless signals transmitted over the wireless communication network along multiple propagation paths; and
      a computing element configured to execute an algorithm to analyze the signal propagation data and extract localization data from the signal propagation data, the localization data specifying a position of objects located within the indoor environment or the passenger cabin, wherein the algorithm is based on test localization data corresponding to a predetermined test arrangement of test objects within the indoor environment or the passenger cabin;
      wherein the algorithm is trained to extract localization data from signal propagation data using training data received from an external positioning system; and
      wherein the algorithm is a machine-learning algorithm executed on the signal propagation data, wherein the machine-learning algorithm is configured to extract the position data based on training data being generated using at least the predetermined test object arrangement within the indoor environment or the passenger cabin;
   acquiring, using the system, signal propagation data of wireless signals transmitted over the wireless communication network along multiple propagation paths; and
   analyzing, using the system, the signal propagation data and extracting localization data from the signal propagation data, the localization data specifying the position of objects located within the indoor environment or within the passenger cabin.

16. The method according to claim 15, wherein the machine-learning algorithm extracts locations of static objects within the passenger cabin; and
wherein the training data is further generated using an object position measurement system.

* * * * *